United States Patent Office 2,922,541
Patented Jan. 26, 1960

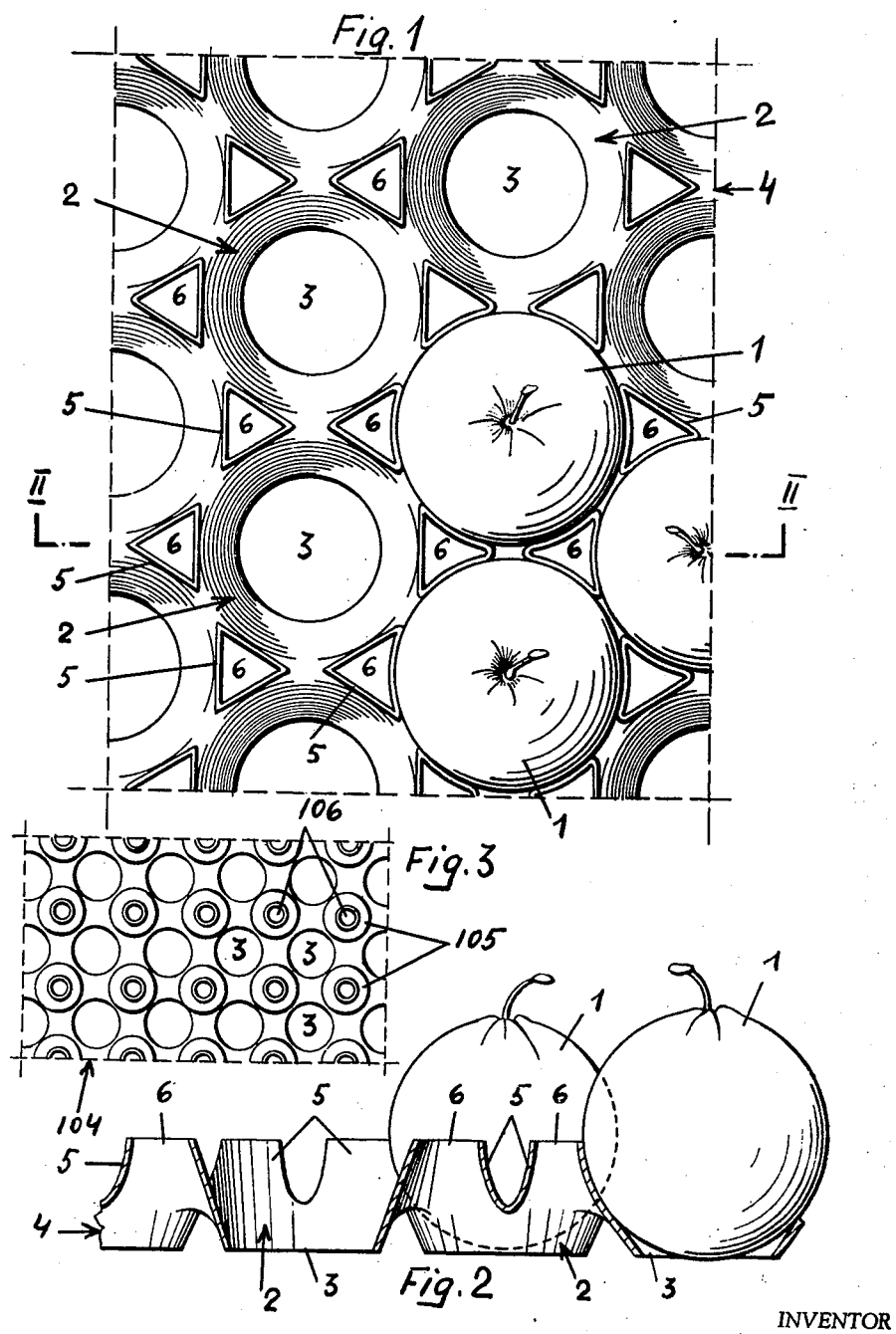

2,922,541

FRUIT PACKING

Guido Martelli, Nerio Martelli, and Francesco Martelli, Bologna, Italy

Application August 2, 1955, Serial No. 525,948

Claims priority, application Italy August 5, 1954

2 Claims. (Cl. 217—27)

This invention relates to fruit packing and aims to provide a method and means for packing fruits in superposed layers in such a manner as to avoid their jamming and to permit a good aeration thereof.

This end is attained by using special holding and supporting trays made of light and inexpensive material such as cardboard, papier mâché, pressed board, synthetic resin and like sheets which are adapted to be inserted in packaging containers and which hold the packed fruits spaced and resting in soft and springy seats and are provided in suitable positions with aeration openings.

The fruit-supporting trays according to the invention resemble, in their general appearance, known cardboard egg trays and, like these, are provided with spaced projections of frusto-pyramidal or frusto-conical shape between which the articles are retained.

However, as a difference from these known egg trays, in the fruit-holding and supporting trays, according to the invention, the projections are open at their tops and bottoms thus providing fruit aeration openings and at the same time resiliently yielding side walls which are slightly deformed elastically by the fruits slightly pressed between a crown of said projections, so that the fruits are slightly clamped between the deformed walls of said projections.

In addition to the air flues provided by the said projections opened at both ends, additional aeration openings are usually provided in the tray sheet part between each crown of projections, and in other positions, if necessary, these latter aeration openings serve also for permitting some additional elastical yielding of said projections, so that, due to the springiness of the projection walls bounding the spaces in which the fruits are inserted and to the provision of said openings, the fruits are firmly held clamped in place, even if their size is subject to the usual commercial variations and are abundantly aerated while in packed condition.

Other objects and advantages will be apparent from the following specification taken in connection with the attached drawing, in which:

Figure 1 shows in plan view a part of a fruit-holding and supporting tray, showing how some fruits are held slightly clamped in seats formed between crown of holding projections.

Figure 2 is a section on line II—II of Figure 1, and

Figure 3 is a diagrammatic plan view, in smaller scale, of another form of fruit tray.

In the embodiment of fruit tray shown in Figures 1 and 2, the fruit tray 4, which is made of cardboard, papier mâché, pressed board or other inexpensive and light sheet material comprises a plurality of fruit-holding seats 2 each having a central concavity provided with an aperture 3 and a number (in the example as shown, six) of frusto-pyramidal or otherwise tapering projections 5 of equilateral triangular cross section and arranged along or parallel to the sides of imaginary hexagons bounding the top part of each seat 2 and covering substantially the whole area of the plate.

Thus the three faces of each projection 5 form part of the walls of three adjacent fruit-seats. The projections are open at both ends, so that, due to the provision of their large top opening 6, the walls of the projections 5 yield elastically when a fruit of somewhat greater circumference than the perimeter of each seat 2 is inserted therein (see right-hand side of Figure 1). On the other hand, this effect is improved due to the provision of the large apertures 3 which increase the resiliency of the plate. Thus, as it is apparent from the drawings, the fruits 1 remain slightly clamped and held fast between elastically deformed walls of the frusto-pyramidal projections 5.

By this arrangement, when each of the tray seats contains a fruit 1, all side faces of the projections 5 are elastically deformed inwardly and in addition the projections may also slightly yield elastically as a whole and thus the tray area comes to be utilised in the best manner and at the same time the fruits come to be aerated by the air circulating through the apertures 3 and the inside of the projections 6 which act as flues.

In the embodiment as shown in Figure 3, the tray 104 comprises a plurality of seats each of which is bounded by four frusto-conical projections 105 arranged in correspondence of the angles of a square. Also the said projections 105 are provided with top openings 106 which, when a somewhat large fruit is inserted in each seat, come to be deformed elastically and thus hold clamped the said fruits.

From the foregoing it is apparent that fruit trays have been provided which meet the usual packing requirements even for delicate fruits, viz. hold the fruits lightly clamped between elastically deformable hollow projections having such a shape and arranged in such a formation as to define seats into which the fruits may be inserted and held slightly clamped by elastically deforming said hollow projections.

Said hollow projections are usually pyramidal, but may be otherwise tapering or may assume any other shape which permits an elastical deformation of their walls under a slight pressure of the fruits into contact therewith and must be open at both ends so as to cooperate, possibly together with other openings provided between said projections, to a good aeration of the fruits held thereby.

By the packaging, the trays filled with fruits are inserted one above the other in containers such as cages or cases, and due to the fact that the fruits are held in place by the said projections of the trays, this work may be done even by substantially unskilled labor.

We claim:

1. A packing tray of soft yieldable material formed with upwardly tapered hollow triangular projections equispaced in a regular pattern over substantially the whole of the tray, said pattern being so arranged that projected imaginary lines coplanar with the projection sides will define a hexagon with the projection sides forming the medial portions of the sides of the hexagon, the six projections on the sides of one such hexagon forming an article receiving recess, and each projection having an opening at its upper and its lower end to permit air to circulate freely around articles loaded in the recesses.

2. A fruit or like tray according to claim 1, wherein the article holding recesses have apertures in their bottoms.

References Cited in the file of this patent

UNITED STATES PATENTS

| | | |
|---|---|---|
| Re. 20,960 | Gates | Jan. 3, 1939 |
| 415,074 | Stevens | Nov. 12, 1889 |
| 695,471 | Miller | Mar. 18, 1902 |
| 1,985,670 | Sykes | Dec. 25, 1934 |
| 2,023,783 | Edgerton | Dec. 10, 1935 |
| 2,045,771 | Graham | June 30, 1936 |
| 2,175,559 | Dreux | Oct. 10, 1939 |
| 2,233,044 | Beck | Feb. 25, 1941 |
| 2,351,754 | Friday | Aug. 1, 1941 |
| 2,691,456 | Shepard | Oct. 12, 1954 |

FOREIGN PATENTS

| | | |
|---|---|---|
| 820,268 | France | July 26, 1937 |